(12) United States Patent
Burdeniuc et al.

(10) Patent No.: US 10,081,700 B2
(45) Date of Patent: Sep. 25, 2018

(54) DELAYED ACTION GELLING CATALYST COMPOSITIONS AND METHODS FOR MAKING POLYURETHANE POLYMERS

(71) Applicant: EVONIK DEGUSSA GMBH, Essen (DE)

(72) Inventors: Juan Jesus Burdeniuc, Colmar, PA (US); Stephan Hermann Wendel, Oldenburg (DE); Christian Brandl, Hamburg (DE); Torsten Panitzsch, Hendstedt-Ulzburg (DE); Renee Jo Keller, Orwigsburg, PA (US)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/093,838

(22) Filed: Apr. 8, 2016

(65) Prior Publication Data
US 2016/0326297 A1  Nov. 10, 2016

Related U.S. Application Data

(60) Provisional application No. 62/157,153, filed on May 5, 2015.

(51) Int. Cl.
| | |
|---|---|
| *C08G 18/24* | (2006.01) |
| *C08G 18/48* | (2006.01) |
| *C08G 18/63* | (2006.01) |
| *C08G 18/66* | (2006.01) |
| *C08G 18/76* | (2006.01) |
| *C08G 18/32* | (2006.01) |
| *C08G 18/34* | (2006.01) |
| *C08J 9/04* | (2006.01) |
| *C08G 18/16* | (2006.01) |
| *C08G 18/18* | (2006.01) |
| *C08G 18/20* | (2006.01) |
| *C08G 18/40* | (2006.01) |
| *C08G 101/00* | (2006.01) |

(52) U.S. Cl.
CPC ......... *C08G 18/244* (2013.01); *C08G 18/165* (2013.01); *C08G 18/1833* (2013.01); *C08G 18/1841* (2013.01); *C08G 18/2081* (2013.01); *C08G 18/24* (2013.01); *C08G 18/246* (2013.01); *C08G 18/3206* (2013.01); *C08G 18/3275* (2013.01); *C08G 18/341* (2013.01); *C08G 18/4072* (2013.01); *C08G 18/4816* (2013.01); *C08G 18/4829* (2013.01); *C08G 18/4841* (2013.01); *C08G 18/632* (2013.01); *C08G 18/6674* (2013.01); *C08G 18/6688* (2013.01); *C08G 18/7621* (2013.01); *C08G 18/7664* (2013.01); *C08J 9/04* (2013.01); *C08G 2101/0008* (2013.01); *C08G 2101/0016* (2013.01); *C08J 2375/04* (2013.01)

(58) Field of Classification Search
CPC ............. C08G 18/165; C08G 18/1833; C08G 18/1841; C08G 18/2081; C08G 18/24; C08G 18/244; C08G 18/246; C08G 18/3206; C08G 18/3275; C08G 18/341; C08G 18/4072; C08G 18/4816; C08G 18/4829; C08G 18/4841; C08G 18/632; C08G 18/6674; C08G 18/6688; C08G 18/7621; C08G 18/7664; C08G 2101/0008; C08G 2101/0016; C08J 9/04; C08J 2375/04

See application file for complete search history.

(56) References Cited

U.S. PATENT DOCUMENTS

| | | | |
|---|---|---|---|
| 4,007,140 A | 2/1977 | Ibbotson et al. | |
| 4,338,408 A | 7/1982 | Zimmerman et al. | |
| 4,433,170 A | 2/1984 | Zimmerman et al. | |
| 5,489,618 A * | 2/1996 | Gerkin | C08G 18/1875 521/117 |
| 5,508,314 A | 4/1996 | Listemann et al. | |
| 5,559,161 A | 9/1996 | Klotz et al. | |
| 5,633,293 A | 5/1997 | Van Court Carr et al. | |
| 5,859,079 A | 1/1999 | Mercando et al. | |
| 5,889,068 A * | 3/1999 | Madaj | C08G 18/0861 521/137 |
| 6,114,403 A | 9/2000 | Mercando et al. | |
| 6,201,033 B1 | 3/2001 | Mercando et al. | |
| 6,232,356 B1 | 5/2001 | Mercando et al. | |
| 6,858,654 B1 | 2/2005 | Wendel et al. | |
| 7,615,580 B2 | 11/2009 | Burdeniuc et al. | |
| 7,666,919 B2 | 2/2010 | Burdeniuc et al. | |
| 2011/0263741 A1 * | 10/2011 | Tu | C08G 18/3275 521/156 |
| 2014/0171527 A1 * | 6/2014 | Yu | C08G 18/5021 521/121 |
| 2016/0075846 A1 * | 3/2016 | Krebs | C08G 18/4841 521/129 |

FOREIGN PATENT DOCUMENTS

| | | |
|---|---|---|
| WO | 0106372 A1 | 1/2001 |
| WO | 0158976 A1 | 8/2001 |
| WO | 03016373 A1 | 2/2003 |
| WO | 03055930 A1 | 7/2003 |
| WO | 2004060956 A1 | 7/2004 |
| WO | 2004113410 A1 | 12/2004 |
| WO | 2013143129 A1 | 10/2013 |

* cited by examiner

*Primary Examiner* — John Cooney

(74) *Attorney, Agent, or Firm* — Andrew H. Chung; Linda S. Li; Jason S. Ngui

(57) ABSTRACT

Additives for making polyurethanes are disclosed. The additives are based on combining specific carboxylic acids or carboxylic di-acids together with a gelling catalysts obtained when mixing an isocyanate-reactive tertiary amine catalysts with dimethyl tin di carboxylate salts and/or dimethyltin mercaptide salts.

4 Claims, 1 Drawing Sheet

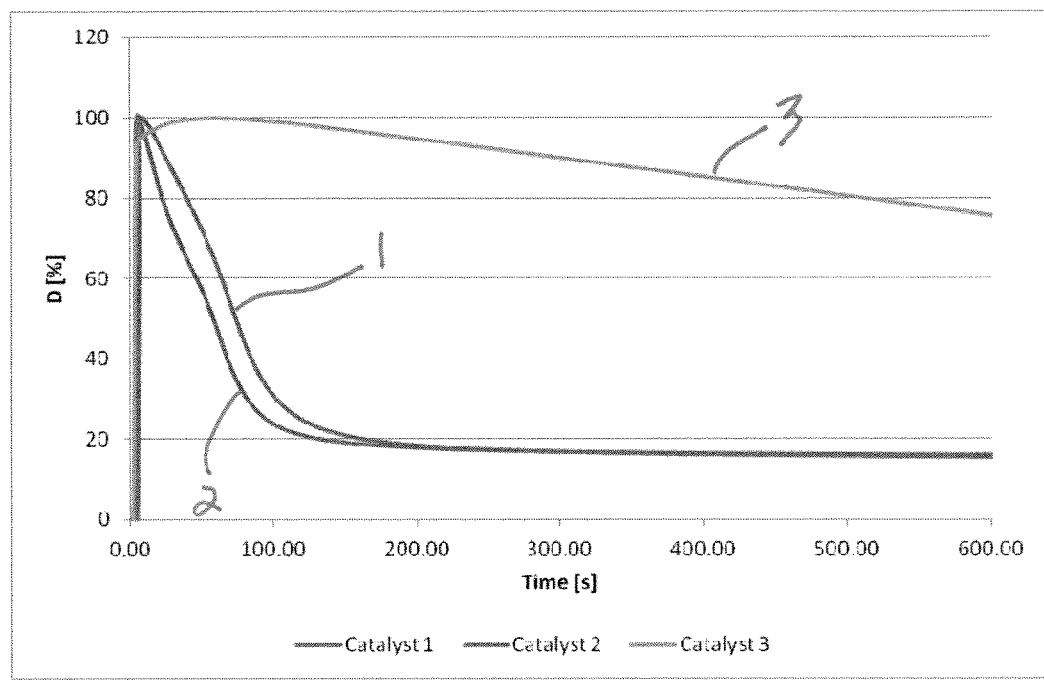
Cure Profile @ 40 °C.

DELAYED ACTION GELLING CATALYST COMPOSITIONS AND METHODS FOR MAKING POLYURETHANE POLYMERS

This application claims the benefit of Application No. 62/157,153, filed on May 5, 2015. The disclosure of Application No. 62/157,153 is hereby incorporated by reference.

BACKGROUND OF THE INVENTION

This invention relates to compositions, processes for producing polyurethane polymers including polyurethane foams using delay action catalysts obtained when organic carboxylic acids such as organic aromatic carboxylic acids and alkyl/alkelnyl organic carboxylic di-acids are used in combination with gelling catalysts such as at least one of dimethyltin dicarboxylate salts, dimethyltin mercaptides salts and tertiary amine catalysts, and to the resultant foams.

Polyurethane foams are widely known and used in automotive, housing and other industries. Such foams are produced by reaction of a polyisocyanate with a polyol in the presence of various additives. Production of water blown foams, in which blowing is performed with $CO_2$ generated by the reaction of water with the polyisocyanate, has therefore become increasingly important. Tertiary amine catalysts are typically used to accelerate blowing (reaction of water with polyisocyante to generate $CO_2$) and gelling (reaction of polyol with isocyanate) reactions. The ability of the tertiary amine catalyst to selectively promote either blowing or gelling is an important consideration in selecting a catalyst for the production of particular polyurethane foam. If a catalyst promotes the blowing reaction to a high degree, much of the $CO_2$ will be evolved before sufficient reaction of isocyanante with polyol has occurred, and the $CO_2$ will bubble out of the formulation, resulting in a collapse of the polymerization mass yielding foam of poor quality. In contrast, if a catalyst strongly promotes the gelling reaction, a substantial portion of the $CO_2$ will be evolved after a significant degree of polymerization has occurred. Again, poor quality foams, this time characterized by high density, excessive shrinkage, broken or poorly defined cells, or other undesirable features, will be produced. Tertiary amine catalysts generally are malodorous and offensive and many have high volatility due to their low molecular weight. Release of tertiary amine during foam processing may present significant safety and toxicity problems, and release of residual amine from customer products is generally undesirable. On the other hand, low vapor pressure-high molecular weight amine catalysts are expected to require very high catalyst usage due to their low N/C ratio making the manufacturing cost too high.

It has been generally accepted that tertiary amine catalysts containing functionalities that can chemically bind into the urethane during the reaction will limit their release from the finished product. Some representative patents of non-fugitive tertiary amine catalysts used by the industry are:

U.S. Pat. No. 4,007,140 discloses the use of N, N'-bis(3-dimethylaminopropyl)urea as a low odor catalyst for the production of polyurethanes. The patent also describes the use of N-(3-dimethylaminopropyl)-formamide as catalysts to make polyurethane foams.

Current commercially available reactive blowing catalysts structurally related to bis(dimethylamino)ethyl ether are described in U.S. Pat. Nos. 4,338,408 and 4,433,170. In particular, 2-[N-dimethylaminoethoxyethyl)-N-methylamino] ethanol is an effective blowing catalyst, albeit less effective than bis(dimethylamino)ethyl ether.

U.S. Pat. Nos. 5,508,314; 5,559,161 and 5,633,293 also states that amine catalysts containing secondary alcohols are preferred because these catalysts exhibit a desirable balance between their promotion of the active hydrogen-isocyanate reactions and their own reactivity with isocyanates. They also teach that amine catalysts containing primary alcohols react rapidly with isocyanates and therefore high use levels are required.

U.S. Pat. No. 5,859,079 describes a polyurethane catalyst composition comprising N, N'-bis(3-dimethylaminopropyl) urea and 3-dimethylaminopropylurea in a ratio that can be varied to systematically control flowability, air-flow, and force to crush.

U.S. Pat. No. 6,114,403 claims a polyurethane catalyst composition comprising N,N'-bis(3-dimethylaminopropyl) urea and 3-dimethylaminopropylurea in a ratio that can be varied to systematically control flowability, % open cell content and k-factor for rigid polyurethane foams.

U.S. Pat. No. 6,201,033 claims a reactive catalyst composition for making water blown flexible polyurethane foam. The catalyst composition comprises a tertiary amino alkyl urea and/or bis(tertiary amino alkyl) urea in combination with either a tertiary amine gelling catalyst or a tertiary amine blowing catalyst.

U.S. Pat. No. 6,232,356 claims a reactive catalyst composition for making water blown flexible polyurethane foam. The catalyst composition comprises a tertiary amino alkyl urea and/or bis(tertiary amino alkyl)urea in combination with either a gelling catalyst or a blowing catalyst. The use of such catalyst composition improves the physical properties of the polyurethane foam.

U.S. Pat. No. 6,858,654 relates to a catalyst composition for catalyzing a polyurethane foaming reaction that includes a gelling catalyst and a blowing catalyst selected such that the resulting polyurethane foam has a low level of volatile and/or malodorous material.

WO2004113410 describes a catalyst composition based on a blend of at least one tertiary amine molecule containing an isocyanate reactive group and at least one compound containing at least one quaternary ammonium alkoxide moiety and at least one tertiary amine group, wherein the later compound is partially or totally neutralized with at least one acidic compound.

U.S. Pat. Nos. 7,666,919 and 7,615,580 claims a method for making polyurethane using non-emissive catalysts in the presence of an ester alcohol or carbamate. The foams produced showed improvements to humid aged deterioration. However, the use of these additives require large use levels (1.0 pphp or higher) to have sufficient impact as to improve the physical properties according to market specifications.

Foam produced using tertiary amine catalysts containing at least one isocyanate-reactive group could overcome the issue of amine emissions but at the expense of sacrificing its chemical resistance to hydrolysis and the mechanical performance of the foam article. In addition, foam produce with non-delayed tertiary amines catalysts can generate higher level of scrap in flexible molded applications because the expanding foaming mass may not be able to properly fill the mold due to the poor flowabiltiy caused by the higher rate of viscosity increase during the polymerization process. This is also true for mold filling applications of elastomeric polyurethane polymer materials. Foam made with methane diisocyanate (MDI) using present technologies may not meet the performance requirements using conventional isocyanate-reactive tertiary amine catalysts described in the prior art. Foam made with toluene diisocyanate (TDI) completely failed to meet the minimum performance requirements using the standard procedures described above in the prior art. In the TDI case, humid aged foam have very poor mechanical properties and therefore the produced articles are not suitable for any practical use due to their expected short life. Although U.S. Pat. Nos. 7,666,919 and 7,615,580 describe a method to address this issue, the economics are unfavorable because the amount of additive needed is too high for a substantial improvement on physical properties.

The disclosure of the previously identified patents and patent applications is hereby incorporated by reference.

Therefore, there is a need in the polyurethane industry for delay action gelling catalysts that can improve the physical properties of polyurethane articles made with catalysts containing isocyanate reactive groups while improving mold filling operations in order to reduce scrap to a minimum. There is also a need to provide catalyst for elastomeric applications that can provide sufficient delay in the beginning of the polymerization process without compromising the cure of the elastomeric material.

BRIEF SUMMARY OF THE INVENTION

The instant invention solves problems associated with conventional practices by providing compositions and processes that: a) allows foam manufacturers to use more TDI in flex-molded foams when using amine catalysts having at least one isocyanate-reactive group; b) requires no substantial processing conditions modifications except for the use of the delay action gelling catalyst of the invention; c) requires no need for extensive formulation optimization; d) reduce scrap due to delay action characteristics of the composition; e) use chemicals that are easy to handle; f) made finished products with excellent physical properties measured at both ambient and after humid aging; d) improves polyurethane polymer cure when the catalyst is used to make elastomeric materials, f) provide elastomeric materials of high quality with the added benefit of not sacrificing mold productivity, among other benefits.

The process according to the invention can be carried out using conventional equipment for producing polyurethane materials. The invention provides a composition for producing polyurethane polymers and polyurethane foams using delay action gelling catalyst. The inventive gelling catalyst can be obtained by mixing: 1) at least one dimethyltin di-carboxylate salt, 2) at least one gelling tertiary amine catalysts and in particular at least one gelling tertiary amine catalysts having at least one isocyanate-reactive group, and 3) at least one organic carboxylic acid including at least one organic aromatic carboxylic acid and/or at least one alkyl/alkenyl or substituted alkyl/alkenyl organic carboxylic di-acid. One aspect of the present invention encompasses a method for producing polyurethane foams by contacting at least one isocyanate compound, at least one polyol compound, at least one blowing agent, at least one polyurethane foam stabilizer and at least one inventive gelling catalyst composition.

The instant invention can solve problems associated with conventional compositions and process by providing compositions and process for producing polyurethane foams with low amine emissions or no-amine emissions according to a test method VDA-278. In particular, this invention discloses the use of delay action catalyst composition to improve the performance of non-fugitive tertiary amine catalysts so foams have improved properties when exposed to ambient and after hot humid aging (e.g., when measured in accordance with Volkswagen method PV3410). For example, usage of the inventive delay action catalyst can minimized foam humid aged deterioration thereby allowing foamed products to maintain key physical properties.

One aspect of the invention relates to a catalyst composition for making polyurethane foams comprising a combination of: i) at least one dimethyltin di-carboxylate salt and/or at least one dimethyltin mercaptide salt, ii) at least one gelling tertiary amine catalyst, and 3) at least one organic carboxylic acid.

Another aspect of the invention relates to the foregoing aspects wherein the at least one gelling tertiary amine catalysts having at least one isocyanate-reactive group.

Another aspect of the invention relates to any of the foregoing aspects wherein the at least one carboxylic acid comprises at least one member selected from the group consisting of organic aromatic carboxylic acids and alkyl/alkenyl or substituted alkyl/alkenyl organic carboxylic di-acids.

A further aspect of the invention relates to a method for making polyurethane polymers and polyurethane foams comprising contacting at least one polyol and at least one isocyanate while in the presence of any of the foregoing catalysts.

Another aspect of the invention relates to a polyurethane polymers and polyurethane foams produced in accordance with the foregoing methods.

A further aspect of the invention relates a foam wherein the foam passes humid aging when measured in accordance with Volkswagen method PV3410.

The various aspects of the invention can be used alone or in combinations with each other.

BRIEF DESCRIPTION OF THE DRAWINGS

FIG. 1 is a curing profile for foams produced in accordance with Example 5

DETAILED DESCRIPTION OF THE INVENTION

The invention relates to compositions and methods for producing polyurethane materials by using an inventive delay action gelling catalyst composition. The invention also relates an inventive delay action catalyst composition to improve the performance of non-fugitive tertiary amine catalysts so foam products have improved properties after ambient and after hot humid aging. The use of the inventive delay action catalyst can, for example, minimize foam humid aged deterioration of polyurethane flexible molded foam allowing foamed products to maintain key physical properties (e.g., properties measured in accordance with Volkswagen method PV3410).

Flexible molded foams of the invention are characterized by excellent physical properties typically have target density (ASTM 3574-A) with range of about 28 to about 80 kg/m$^3$, air flow (ASTM 3574-G) with range of about 40 to about 120 L/M, ILDs (indentation load deflection method ASTM 3574-B1) with range of about 150 to about 600 N, support factor (ASTM 3574-B1) with range of about 2.5 to about 3.5, preferably about 3, and resilience (ASTM 3574-H) range of about 40 to about 80%. In one aspect of the invention a desirable foam has a Tensile/HA Tensile/Elongation/HA Elongation=DIN 53571—Range of about 80 to about 200%, a 50% Compression Set=ASTM D3574-D—Range of about 1 to about 20%, a HA Compression Set=ASTM D3574-J1 and J2—Range of about 5 to about 15%, and Tear=ASTM D3574-F—Range of about 150 to about 400. The following table below summarizes the desired values for key physical properties for flexible molded foam as well as the standard conditions and measurement methods.

| Catalyst | Desired Values | Conditions | Method (Units) |
|---|---|---|---|
| PPHP | — | — | — |
| Tensile (Kpa) | ≥70 | Ambient | DIN 53571 (Kpa) |
| Elongation (%) | ≥70 | Ambient | DIN 53571 (%) |
| 50% Compression Set | ≤18 | Ambient | ASTM D3574-D (%) |
| Humid Aged Tensile (Kpa) | ≥70 | Volkswagen | DIN 53571 (%) |
| Humid Aged Elongation (%) | ≥70 | Volkswagen | DIN 53571 (%) |
| 50% Humid Aged Compression Set (%) | ≤30 | Volkswagen | ASTM D3574-D (%) |
| Humid Aged Load Loss | −45 to +15 | Volkswagen | ISO-3386-1 |

The instant invention can also allow for better mold filling during the manufacture of polyurethane elastomers without sacrificing mold productivity and finished product cure resulting from the use of acid blocked tertiary amine catalysts.

The inventive delay action gelling catalyst comprises: 1) at least one dimethyltin di-carboxylate salt and/or at least one dimethyltin mercaptide salt, 2) at least one gelling tertiary amine catalysts and in particular at least one gelling tertiary amine catalysts having at least one isocyanate-reactive group, and 3) at least one organic carboxylic acid wherein the carboxylic acid can comprise at least one organic aromatic carboxylic acid and/or at least one alkyl/alkenyl or substituted alkyl/alkenyl organic carboxylic di-acid. Without wishing to be bound by any theory or explanation, it is believed that while the acid can protonate at least a portion of the amine, the acid and the amine are present in the inventive catalyst.

Examples of dimethyltin di-carboxylate salt that can be used to make the delay action gelling catalyst can include at least one member selected from the group of dimethyltin diacetate, dimethyltin dipropionate, dimethyltin dibutanoate, dimethyltin dipentanoate, dimethyltin dihexanoate, dimethyltin diheptanoate, dimethyltin dioctanoate, dimethyltin dinonanoate, dimethyltin didecanoate, dimethyltin diundecanoate, dimethyltin dilaureate, dimethyltin dimyristate, dimethyltin dipalmitate, dimethyltin distearate, dimethyltin dioleate, the corresponding neo-acid derivatives including dimethyltin dineopentanoate, dimehtyltin dineohexanoate, dimethyltin dineoheptanoate, dimethyltin dineooctanoate, dimethyltin dineononanoate, dimethyltin dineodecanoate, dimethyltin dineoundecanoate, dimehtyltin dineododecanoate, dimethyltin dineoundecanoate, dimethyltin dineododecanoate, dimethyltin dineotetradecanoate, dimethyltin dineohexadecanoate, dimethyltin dineooctadecanoate, their mixtures and other similar salts including unsaturated and polyunsaturated fatty acid derivatives. Examples of dimethyltin mercaptides salts include at least one member selected from the group consisting of dimethyltin dilaurylmercaptide, dimethyltin bis(2-ethylhexylmercaptoacetate), dimethyltin bis(octylmercaptoacetate), dimethyltin bis(butylmercaptoacetate), dimethyltin bis(propylmercaptoacetate), dimethyltin bis(ethylmercaptoacetate), dimethyltin bis(methylmercaptoacetate), dimethyltin bis(pentylmercaptoacetate), dimethyltin bis(hexylmercaptoacetate), dimethyltin bis(heptylmercaptoacetate), dimethyltin bis(nonylmercaptoacetate), dimethyltin bis(decylmercaptoacetate), dimethyltin bis(undecylmercaptoacetate), dimethyltin bis(dodecylmercaptoacetate), dimethyltin bis(palmitoleylmercaptoacetate), dimethyltin bis(oleylmercaptoacetate), dimethyltin bis(linoleylmercaptoacetate), dimethyltin bis(docosahexanoylmercaptoacetate), dimethyltin bis(caprylicmercaptoacetate), dimethyltin bis(capricmercaptoacetate), dimethyltin bis(myristicmercaptoacetate), dimethyltin bis(palmiticmercaptoacetate), dimethyltin bis(stearicmecaptoacetate) and the like. The amount of tin salt can range from about 0.01 pphp to about 10 pphp, about 0.01 pphp to about 5 pphp and in some cases about 0.01 pphp to about 2 pphp where pphp denotes parts per hundred parts of polyol.

Examples of tertiary amine gelling catalyst that can be used to make the delay action gelling catalyst composition can include at least one member selected from the group consisting of N,N-bis(3-dimethylaminopropyl)-N-isopropanolamine, N,N-bis(3-diethylaminopropyl)-N-isopropanolamine, N,N-dimethylaminoethyl-N'-methyl ethanolamine, N,N-diethylaminoethyl-N'-methyl ethanolamine, N,N-dimethylaminopropyl-N'-methyl ethanolamine, N,N-diethylaminopropyl-N'-methyl ethanolamine, N,N-dimethylaminopropyl-N'-ethyl ethanolamine, N,N-diethylaminopropyl-N'-ethyl ethanolamine, N,N,N'-trimethylaminopropyl ethanolamine, N,N,N'-triethylaminopropyl ethanolamine, N,N-dimethylethanolamine, N,N-diethylethanolamine, N,N-dimethyl-N',N'-2-hydroxy(propyl)-1,3-propylenediamine N,N-diethyl-N',N'-2-hydroxy(propyl)-1,3-propylenediamine, dimethylaminopropylamine, diethylaminopropylamine, (N,N-dimethylaminoethoxy)ethanol, N-methyl-N'-hydroxyethyl-piperazine, bis(N,N-dimethyl-3-aminopropyl)amine, bis(N,N-diethyl-3-aminopropyl)amine N,N-dimethylaminopropyl urea, N,N-diethylaminopropyl urea, N,N'-bis(3-dimethylaminopropyl)urea, N,N'-bis(3-diethylaminopropyl)urea; bis(dimethylamino)-2-propanol, 6-dimethylamino-1-hexanol, N-(3-aminopropyl) imidazole), N-(2-hydroxypropyl)imidazole, and N-(2-hydroxyethyl) imidazole, 2-hydroxymethyl-triethylenediamine or a combination thereof.

Additionally or alternatively, in one embodiment, the delay action gelling catalyst is used in conjunction with a blowing catalyst component 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl) ether, or a combination thereof. In one embodiment, the tertiary amine catalyst used to make the delay action gelling catalyst is highly volatile and is not isocyanate-reactive. For example, in one embodiment, the tertiary amine catalyst component of the delay action gelling catalyst is a volatile gelling catalyst and is or includes diazobicyclooctane action gelling catalyst is (triethylenediamine), 1,8-diazabicycloundec-7-ene, 1,5-diazabicyclo (4.3.0)non-5-ene, tris(dimethylaminopropyl)amine, dimethylaminocyclohexylamine, bis(dimethylaminopropyl)-N-methylamine, 1,2-dimethyaminoimidazole, 1-methylaminoimidazole, N-methyldicyclohexylamine, hexadecyldimethylamine, or a combination thereof.

Additionally or alternatively, in one embodiment, the tertiary amine catalyst component of the delay action gelling catalyst can be used in conjunction with a volatile blowing catalyst and is or includes bis-dimethylaminoethyl ether, pentamethyldiethylenetriamine, hexamethyltriethylenetetramine, heptamethyltetraethylenepentamine and related compositions, higher permethylated polyamines, 2-[N-(dimethylaminoethoxyethyl)-N-methylamino]ethanol and related structures, alkoxylated polyamines, N,N,N'-trimethyl-N'-3-aminopropyl-bis(aminoethyl) ether, imidazoleboron compositions or a combination thereof.

The amount of tertiary amine gelling catalyst can range from about 0.01 pphp to about 20 pphp about 0.05 pphp to about 10 pphp and in some cases about 0.1 pphp to about 5 pphp. The amount of blowing catalyst can range from about 0 to about 10 pphp; from 0.01 pphp to 5 pphp and from 0.05 pphp to 2 pphp.

Examples of organic carboxylic acids that can be used to make the delay action gelling catalyst composition can include at least one of diacids, triacids and polyacids including malonic, maleic, succinic, glutaric, adipic, pimelic, suberic, azelaic, sebacic, phthalic, isophthalic, and therephthalic. Other acids include carboxylic acids containing functional groups able to react with isocyanate to render the carboxylic acid immobilized in the polyurethane polymer. Examples of such acids include glycolic acid, gluconic acid, phthalic acid-mono-2-hydroxyethyl ester (made by condensation of one mole of phthalic acid and one mole of ethylene glycol), phthalic acid-mono-2-hydroxyethyloxyethyl ester (made by condensation of one mole of phthalic acid and one mole of diethylene glycol), phthalic acid-mono-2-hydroxyethyl-poly(ethylene-oxide) ester (made by condensation of one mole of phthalic acid and one mole of polyethylene glycol such as PEG-200) phthalic acid-mono-2-hydroxypropyl ester (made by condensation of one mole of phthalic acid and one mole of propylene glycol), phthalic acid-mono-2-hydroxpropyloxypropyl ester (made by condensation of one mole of phthalic acid and one mole of dipropylene glycol), phthalic acid-mono-2-hydroxypropyl-poly(propylene-oxide) ester (made by condensation of one mole of phthalic acid and one mole of polypropylene glycol such as PPG-200) or their combinations or any other acids containing isocyanate reactive groups. The amount of acid can range from about 0.01 pphp to about 30 pphp, about 0.05 pphp to about 20 pphp and in some cases about 0.1 pphp to about 10 pphp.

The inventive catalyst can be obtained by mixing first the acid and the amine. Thereafter this mixture is cooled down to room temperature and the tin catalyst is added to the mixture.

One aspect of the invention process relates to producing polyurethane foams cushions suitable for automotive applications wherein the catalyst was added to about 302 g of the premix (described in Table 1) in a 32 oz (951 mL) plastic cup. The formulation was mixed for about 10 seconds at about 6,000 RPM using an overhead stirrer fitted with a 2 in (5.1 cm) diameter stirring paddle.

TABLE 1

| (Premix Components) | |
| --- | --- |
| Component | PPHP |
| SPECFLEX ® NC 630[1] Polyol | 50 |
| SPECFLEX ® NC 700[2] Polyol | 50 |
| Water | 3.0 |
| DABCO ® DC6070[3] | 0.6 |
| (low emissions silicon surfactant) | |
| Gelling Catalyst[4] | Varied |
| Blowing Catalyst | Varied |
| Diethanolamine (crosslinker) | 0.70 |
| Toluene diisocyanate | NCO index = 100 |

[1]High functionality capped polyether polyol of high molecular weight, functionality, and primary hydroxyl content with a base polyol molecular weight of about 5500, available from Dow Chemical Company, Midland, Mich.
[2]Grafted polyether polyol containing copolymerized styrene and acrylonitrile, base polyol molecular weight about 4800, available from Dow Chemical Company, Midland, Mich.
[3]Silicone surfactant is available from Air Products and Chemicals, Inc.
[4]The amine catalyst is available from Air Products and Chemicals, Inc.

Toluene diisocyanate was added in an amount sufficient to produce foam with an NCO index of approximately 100. The formulation was mixed well for about 6 seconds at about 6,000 RPM using the same stirrer. The mixture was poured into a pre-heated mold at 70° C. and 4 minutes demold time. The pad-foams were removed from the mold, hand crushed, weighed and machine crushed at 75% pad thickness. Foams were stored under CTH conditions for 48 hours before being cut and tested. The physical properties of polyurethane foams were measured under ambient conditions and after humid ageing.

The formulation which was used for the evaluation of a polyurethane elastomeric material is shown in Table 2. All components except of the isocyanate were blended together with a high speed stirrer at 3600 rpm. This blend was then stored at 40° C. for 24 hours. The MDI was also stored for 24 h before usage at 40° C. The curing profile of the different catalyst compositions were monitored via curing monitor device (Format Messtechnik). Shore hardness was determined with a shore A durometer. Curing and pot life time were determined with CMD (curing monitor devise) which measure the changes in dielectric polarization.

TABLE 2

| Elastomeric Formulation | |
| --- | --- |
| Elastomeric Formulation | |
| Component | pphp |
| Polyether polyol (triol; OH # = 28) | 88.9 |
| 1,4-butane diol | 9.0 |
| Silicone Surfactant (Dabco DC5000) | 0.1 |
| Molecular sieve powder (3 A) | 2.0 |
| Catalyst | 0.4 |
| MDI (NCO # = 27.4) | 38 |

Polyols

Flexible polyurethanes are produced from the polymerization reaction of organic isocyanate compounds with polyol hydroxyl groups. Polyols suitable for use in the present invention include polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

In one aspect of the present invention, a single high molecular weight polyether polyol may be used. Alternatively, a mixture of high molecular weight polyether polyols, for example, mixtures of di- and tri-functional materials and/or different molecular weight or different chemical composition materials may be used. Such di- and tri-functional materials include, but are not limited to ethyleneglycol, polyethyleneglycol, propyleneglycol, polypropyleneglycol, glycerine, glycerine-based polyether triols, trimethylolpropane, trimethylolpropane-based polyether triols, 1,3-butane diol, 1,4-butane diol, 1,6-hexane diol, neopentyl glycol, and other similar compounds or mixtures.

In addition to polyalkylene ether polyols, polymer polyols are also suitable for use in the present invention. Polymer polyols are used in polyurethane foams to increase the foam's resistance to deformation, for example, to improve the load-bearing properties of the foam. Examples of polymer polyols include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol. Depending upon the load-bearing requirements, polymer polyols may comprise from about 20 to about 80 percent by weight of the total polyol content. Suitable base polyols are also shown and described in WO 03/016373 A1, WO 01/58976 A1, WO 04/060956 A1, WO 03/016372 A1, and WO 03/055930 A1, each of which are hereby incorporated by reference in their entirety. Suitable base polyols include, but are not limited to, the polyether polyols. In one embodiment, the polyether polyols are poly(alkylene oxide) polymers, such as, poly(ethylene oxide), poly(propylene oxide), and/or copolymers with terminal hydroxyl groups derived from polyhydric compounds (for example, diols and triols). In one embodiment, the base polyol is or includes triols having a molecular weight between about 4,500 and about 6,000 and/or diols having a molecular weight between about 2,000 and about 4,000. In one embodiment, the diols and triols utilized are ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, other suitable low molecular weight polyols, or a combination thereof. In one embodiment, the base polyol is or includes polyhydroxy-terminated acetal resin, hydroxy-terminated amine, hydroxyl-terminated polyamine, or a combination thereof. In one embodiment, the base polyol is or includes polyalkylene carbonate-based polyols, phosphate-based polyols, or a combination thereof. The amount of polyol typically can range from about 20 pphp to about 100 pphp (one single polyol) of the foamable composition.

In one embodiment, the base polyol is a single high molecular weight polyether polyol. In another embodiment, the base polyol is a mixture of high molecular weight polyether polyols, each having a different molecular weight or different chemical composition. In this embodiment, the base polyol includes di-functional and tri-functional materials, such as, but not limited to, polyethylene glycol, polypropylene glycol, glycerol-based polyether triols, trimethylolpropane-based polyether triols, other similar ester-free compounds or mixtures, or a combination thereof. In one embodiment, the base polyol is end-capped with ethylene oxide (for example, at greater than about 75% primary hydroxyl groups) with a capping range between about 10% and about 20%.

Additionally or alternatively, in one embodiment, the polyol component includes copolymer polyols. The copolymer polyols form, by weight, up to about 50% of the total polyol content (the total polyol content being based upon the amount of the base polyol, the copolymer polyol, and any other polyols in the polyurethane composition). The copolymer polyols improve polyurethane foam formed by the polyurethane composition by increasing resistance to deformation of the polyurethane foam, thereby increasing load-bearing properties of a polyurethane foam formed by the polyurethane composition. In one embodiment, the copolymer polyol is or includes a graft polyol, a polyurea-modified polyol, or a combination thereof. The graft polyol is any suitable graft polyol. In one embodiment, the graft polyol is prepared by copolymerizing vinyl monomers (for example, styrene and acrylonitrile) with a suitable starting polyol. In one embodiment, the starting polyol is or includes glycerol-initiated triol, end-capped with ethylene oxide (for example, at about 80% to about 85% primary hydroxyl groups). In this embodiment, the graft polyol includes copolymer grafted to the starting polyol, homopolymers of the vinyl monomers, and the starting polyol (unaltered). In one embodiment, the graft polymer includes the styrene or acrylonitrile at a concentration, by weight, between about 5% and about 45%. In one embodiment, the polyurea-modified polyol is formed by the reaction of a diamine and a diisocyanate in the presence of the starting polyol. In this embodiment, the polyurea-modified polyol includes polyurea dispersion. In one embodiment, the polyurea modified-polyol is or includes polyisocyanate poly addition (PIPA) polyols, for example, formed in situ from a reaction of the isocyanate 117 and an alkanolamine in the starting polyol.

In one aspect of the invention, the polyol comprises polybutandiene polyol. Hydroxyl terminated polybutadiene (HTBD) is an oligomer or polymer of butadiene having OH functionality at each end of the polymer chain.

Other suitable polyols that can be used according to the invention include natural oil polyols or polyols obtained from renewable natural resources such as vegetable oils. Polyols useful in the preparation of polyurethane foam from inexpensive and renewable resources can be desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, transesterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) monounsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

Other suitable polyols include amine polyether polyols such as Mannich polyols. Mannich polyols are obtained by the condensation reaction of: 1) carbonylic compound, 2) a primary or secondary amine and 3) organic compound with enolyzable acidic hydrogen such as phenols, ketones but most commonly phenol and substituted phenols. The Mannich bases can be used as initiators for alkoxylation reactions with ethylene oxide and propylene oxide giving amine containing polyether polyols called as Mannich polyols. Mannich polyols are also used in spray foam formulations to increase the reactivity of the system. Typical Mannich polyols are typically prepared by condensation of phenol with formaldehyde in the presence of hydroxyl containing amines such as diethanolamine, ethanolamine and the like.

Open cell flexible molded foams typically use a main or "base" polyether polyol. Polyether polyols include poly (alkylene oxide) polymers such as poly(ethylene oxide) and poly(propylene oxide) polymers and copolymers with terminal hydroxyl groups derived from polyhydric compounds, including diols and triols. These polyols can have a functionality of about 2 to about 8, about 2 to about 6 and typically about 2 to about 4. The polyols can also have a hydroxyl number from about 10 to about 900, and typically about 15 to about 600 and more typically about 20 to about 50. Flexible molded foams also use copolymer polyols as part of the overall polyol content in the foam composition with OH numberst typically in the range of 15 to 50, MW ranges typically from 1200 to 8000 and more typically 2000 to 6000 and % solids form 10% to 60%. Open cell low density spray foam typically use a polyether polyol with an average MW from 1500 tp 6000 and OH number from 15 to 50. Polyols amounts are defined by pphp. There are 4 types of polyols above defined: standard polyol or polyether polyol which can be used in the range of about 100 pphp (the only polyol) to about 10 pphp. The copolymer polyol (CPP) can be used in the range of about 0 to about 80 pphp. The NOP (natural oil polyol) can be present from about 0 to about 40 pphp. Finally, the Mannich polyol is used in combination with other polyol and in a range from 0 pphp to 80 pphp, about 0 pphp to about 50 pphp and in some cases about 0 pphp to about 20 pphp.

Polyester polyols can also be used, including those produced when a dicarboxylic acid is reacted with an excess of a diol. Non-limiting examples include adipic acid or phathalic acid or phthalic anhydride reacting with ethylene glycol, diethylene glycol, polyethylene glycols, propylene glycol, dipropylene glycol, polypropylene glycol, butanediol, hexanediol and the like.

Most common polyester polyols are made from phthalic, isophthalic and terephthalic acids. Esterification of these acids with polyol initiators such as ethylene glycol, diethylene glycol, propylene glycol, dipropylene glycol, butanediol, polyethylene glycols of various molecular weights, glycerin, pentanetriol, and the like can yields polyester polyols with different physical properties, molecular weights and molecular architectures but all characterized by their poor hydrolytic stability.

Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

The amount of polyol in a given formulation is express in pphp (parts per hundred parts of polyol) and by definition the total amount of polyol in a given formulation is 100 pphp.

The OH number can range from about 15 to about 50, about 10 to about 600 and in some cases about 5 to about 1800 The functionality of the polyol can range from about 2 to about 3, about 1.8 to about 4 and in some cases 1.5 to about 10

Blowing Agents

Polyurethane foams are produced from the reaction of isocyanates with a blowing agent to produce voids in the polyurethane matrix during polymerization. Blowing agents include, for example, inert compounds with low boiling points which are vaporized during the exothermic polymerization reaction. Such blowing agents are generally inert compounds that do not decompose or react during the polymerization reaction. The reaction exotherm is generally sufficient to vaporize the blowing agent, which then becomes entrapped in the polyurethane matrix, resulting in the formation of voids or cells. Optionally, additional heat can be added during the reaction to promote vaporization of the blowing agent. Examples of such blowing agents include, but are not limited to, chlorofluorocarbons, hydrogen-containing fluorocarbons, hydrogen-containing chlorofluorocarbons, hydrogen-containing chlorofluoroolefins, hydrogen-containing fluoroolefins, chlorofluoroolefins, chloroolefins, fluoroolefins, acetone and low-boiling hydrocarbons such as cyclopentane, isopentane n-pentane and their mixtures. Other suitable blowing agents include compounds which react with isocyanate compounds to produce a gas. The most widely used blowing agent of this type is water, which reacts with isocyanate to produce carbon dioxide. As the gas is produced, it becomes trapped in the polyurethane matrix, forming voids or cells. Suitable amounts include, but are not limited to, about 0 pphp to about 80 pphp, about 0 to about 60 pphp, about 0 pphp to about 10 pphp, about 0 pphp to about 5 pphp, or any suitable combination, sub-combination, range, or sub-range within. In embodiments that are water-blown, the isocyanate component reacts, thereby forming carbon dioxide.

Optional Additives

In one aspect, this invention encompasses a method for producing a polyurethane foam comprising reacting at least one isocyanate compound, at least one polyol compound, at least one blowing agent, at least one tertiary amine catalyst composition, at least one delay action gelling catalyst and optionally, at least one auxiliary component. In another aspect, the present invention provides a method for catalyzing the reaction between at least one isocyanate compound, at least one active hydrogen-containing compound, and optionally, at least one auxiliary component.

Examples of auxiliary components include, but are not limited to, cell stabilizers, crosslinking agents, chain extenders, pigments, fillers, flame retardants, auxiliary gelling catalysts, auxiliary blowing catalysts, transition metal catalysts, or any combination thereof.

Suitable cell stabilizers (forming a portion or all of the surfactant component) include, but are not limited to, silicon surfactants, anionic surfactants, or a combination thereof. In one embodiment, the cell stabilizer is devoid of any acyl group and is the silicon surfactant, such as, polyalkylsiloxane, polyoxyalkylene polyol-modified dimethylpolysiloxane, alkylene glycol-modified dimethylpolysiloxane, or a combination thereof. In one embodiment, the silicon surfactant includes an acyl group. In one embodiment, the cell stabilizer is the anionic surfactant, such as, a salt of a fatty acid, a salt of a sulfuric acid ester, a salt of a phosphoric acid ester, a salt of a sulfonic acid, or a combination thereof. In one embodiment, the pre-mix and/or the polyurethane composition include the cell stabilizers at a suitable predetermined amount. Suitable predetermined amounts include, but are not limited to, about 0.1 pphp to about 20 pphp, 0.1 pphp to about 10 pphp, 0.1 pphp to about 5 pphp, or any suitable combination, sub-combination, range, or sub-range within.

Suitable crosslinking agents (forming a portion of or all of the crosslinking component) include, but are not limited to, low-molecular weight compounds containing at least two moieties, such as, hydroxyl groups, primary amino groups, secondary amino groups, other active hydrogen-containing groups that are reactive with an isocyanate group, or a combination thereof. In one embodiment, the crosslinking agent is a polyhydric alcohol (for example, a trihydric alcohol, such as, glycerol or trimethylolpropane), a polyamine, or a combination thereof. In one embodiment with the crosslinking agent being a polyamine, the crosslinking agent is diethyltoluenediamine, chlorodiaminobenzene, diethanolamine, diisopropanolamine, triethanolamine, tripropanolamine, 1,6-hexanediamine, or a combination thereof. In one embodiment with the crosslinking agent being a diamine, the crosslinking agent includes twelve or fewer carbon atoms, seven carbon atoms, or less than seven carbon atoms. In one embodiment, blending the crosslinking agent(s), such as a low molecular weight crosslinker, with the polyol component builds hardness and promotes faster demolding. In one embodiment, the amount and/or concentration of the crosslinking agent(s) is increased or decreased, thereby respectively increasing or decreasing hardness. The amount of crosslinking agents typically ranges from about 0 pphp to about 20 pphp of the foamable composition.

In one embodiment, the pre-mix further includes chain extenders, pigments, fillers, flame retardants, auxiliary urethane gelling catalysts, auxiliary urethane blowing catalysts (for example, bis-dimethylaminoethyl ether) in addition to the blowing component (for example, at about 0.12 pphp), transition metal catalysts, or a combination thereof. As is further described below, in some embodiments, the pre-mix includes further components that are added through any suitable procedures and/or at any suitable portion of the process, for example, as part of the pre-mix.

Suitable chain extenders include, but are not limited to, compounds having a hydroxyl or amino functional group, such as, glycols, amines, diols, water, or a combination thereof. In one embodiment, the chain extender is ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or a combination thereof. The amount of chain extenders typically ranges from about 0 pphp to about 20 pphp of the foamable composition.

Suitable pigments include, but are not limited to, organic pigments, inorganic pigments, or a combination thereof. The pigments permit coloring (for example, to match a color grade), concealing (for example, to conceal yellowing), or a combination thereof. In one embodiment with the pigment being an organic pigment, the pigment is an azo/diazo dye, a phthalocyanine, dioxazine, carbon black, or a combination thereof. In one embodiment with the pigment being an inorganic pigment, the pigment is titanium dioxide, iron oxide, chromium oxide, or a combination thereof. The amount of pigments typically ranges from about 0 pphp to about 20 pphp of the foamable composition.

Suitable fillers increase the density and load bearing properties of polyurethane foams. In one embodiment, the filler is barium sulfate, calcium carbonate, or a combination thereof. The amount of filler typically can range from about 0 pphp to about 20 pphp of the foamable composition.

Suitable flame retardants reduce the flammability of polyurethane foams. In one embodiment, the flame retardant is a chlorinated phosphate ester, a chlorinated paraffin, a melamine powder, or a combination thereof. In one embodiment, the pre-mix and/or a polyurethane composition include the flame retardants at a suitable amount. Suitable amounts include, but are not limited to, about 0 pphp to about 20 pphp, about 0 pphp to about 10 pphp, about 0 pphp to about 5 pphp, about 1 pphp to about 20 pphp, about 1 pphp to about 10 pphp, about 1 pphp to about 5 pphp, or any suitable combination, sub-combination, range, or sub-range within.

Polyurethane Materials

Polyurethane materials produced in accordance with the present invention are prepared by reaction of any suitable organic isocyanate compounds with any suitable polyol compounds, as described in the art. Organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2, 4-TDI, 2,6-TDI, or any mixture thereof is used to produce polyurethane foams. Other suitable isocyanate compounds are mixtures of diisocyanates known commercially as "crude MDI", marketed as PAPI by Dow Chemical Company, which contains about 60% of 4, 4'-diphenylmethane diisocyanate along with other isomeric and analogous higher polyisocyanates. Also suitable are "prepolymers" of these isocyanate compounds, comprising a partially prereacted mixture of a polyisocyanate and a polyether or polyester polyol.

Polyurethane foams produced using conventional tertiary amine non-fugitive catalysts, which is a tertiary amine catalyst containing an isocyanate reactive functionality, have poor humid aged physical properties when compared to foams produced with traditional fugitive catalysts. Thus, foams made with any tertiary amine catalyst (cyclic or alicyclic) containing any N—H isocyanate reactive functionalities from primary/secondary amine groups, amide, urea, imidazole, among others, or any —OH functionality from any type of alcohol are typically characterized by poor humid aged physical properties. The polyurethane foam products with the process of the invention are characterized by excellent ambient physical properties. As shown in the following Tables 5, 6, and 7, the humid aged physical properties of foams obtained by the inventive process are improved when using this process. The inventive process uses a delay action gelling catalyst which can be incorporated or mixed with the pre-blended material containing polyol, water, surfactant, blowing agent, cross-linker and other additives.

Polyurethane foam produced in accordance with one aspect of the present invention, has an isocyanate index between about 70 and about 115 and comprises the following components by weight:

TABLE 3

Polyurethane Components

| Component | Percent by Weight |
|---|---|
| Polyol | 20-100 |
| Polymer polyol | 0-80 |
| Silicon surfactant | 1-2.5 |
| Blowing agent | 2-4.5 |
| Crosslinker | 0.5-2 |
| Catalyst composition | 0.25-2 |

The term "isocyanate index" (also commonly referred to as NCO index), is defined herein as the number of equivalents of isocyanate, divided by the total number of equivalents of active hydrogen, multiplied by 100. The NCO index is represented by the formula: NCO index=[NCO/(OH+NH)]*100.

Although the present invention has been described as useful for preparing flexible polyurethane foams, the invention may also be employed to prepare polyurethane elastomers, polyurethane coatings, polyurethane composites, polyurethane sealants, among other semi-flexible polyurethane materials. Flexible foams typically use polymer polyol as part of the overall polyol content in the foam composition, along with conventional triols of about 4000-5000 weight average molecular weight (Mw) and hydroxyl number (OH#) of about 28-35. Semiflexible molded foams have been utilized for many applications in the automotive area. The major applications are instrument panels and interior trims. The two main components are the base polyol and copolymer polyol (CPP). The base polyol is utilized at levels between about 70-100 pphp. The molecular weight of base polyols ranges from about 4500 to about 6000 for triols and from about 2000 to about 4000 for diols. Ethylene-oxide-capped polyether polyols have replaced most polyester polyols as the base polyol. The primary hydroxyl content is usually greater than about 75 wt. % and the capping range is typically about 10-20 wt. %. The other major component is co-polymer polyol (CPP), which are used at levels up to about 20 wt. %. The base polyol and CPP are blended with low molecular weight cross-linkers to build hardness and promote faster demolding. The level of cross-linker varies depending on the hardness requirement of the finished part. Water levels are chosen to give free rise densities from about 3 to about 6 pounds. Cell openers are also utilized in semiflexible foams to reduce the internal foam pressure during the cure cycle and thus reduce pressure-relief voids and "parting lines". Adhesion promoters can be added, depending upon the quality of the vinyl skin, to improve the adhesion between the polyurethane foam and the vinyl skin. Non-emissive catalysts can reduce the discoloration of the vinyl skin typically observed with conventional amine catalysts because they can react with the isocyanate to form a covalent bond with the polyurethane polymer.

The following Examples are provided to illustrate certain aspects of the invention and shall not limit the scope of the appended claims.

EXAMPLE 1

Physical properties comparison of foam made with reactive and non-reactive tertiary amine catalyst To make a foam pad the catalyst was added to about 302 g of the premix (described in Table 5) in a 32 oz (951 mL) paper cup. The formulation was mixed for about 10 seconds at about 6,000 RPM using an overhead stirrer fitted with a 2 in (5.1 cm) diameter stirring paddle.

TABLE 4

Premix Components

| Component | PPHP (Fugitive) | PPHP (Non-Fugitive) |
|---|---|---|
| Specflex ® NC630 Polyol[1] | 50 | 50 |
| Specflex ® NC700 Polyol[2] | 50 | 50 |
| Water | 3.5 | 3.5 |
| Dabco DC6070[3] | 0.60 | 0.60 |
| Gelling Non-Reactive Dabco ® 33LV[4] | 0.40 | — |
| Gelling Reactive BDMAPAU[5] | — | 0.30 |
| Blowing Non-Reactive Dabco ® BL11[6] | 0.12 | — |
| Catalyst 2 (Blowing) AP-TMAEE[7] | — | 0.30 |
| Crosslinker (DEOA 100%)[8] | 1.0 | 1.0 |
| TDI Index | 100 | 100 |

[1]High functionality capped polyether polyol of high molecular weight, functionality, and primary hydroxyl content with a base polyol molecular weight of about 5500, available from Dow Chemical Company, Midland, MI.
[2]Grafted polyether polyol containing copolymerized styrene and acrylonitrile, base polyol molecular weight about 4800, available from Dow Chemical Company, Midland, MI.
[3]Silicone surfactant is available from Air Products and Chemicals, Inc.
[4]DABCO ® 33LV is a 33% solution of triethylenediamine in DPG commercially available from Air Products and Chemicals, Inc.
[5]BDMAPAU = N,N'-bis(3-diethylaminopropyl)urea;
[6]DABCO ® BL11 is a 70% solution of bis(dimethylaminoethyl)ether in DPG commercially available from Air Products and Chemicals, Inc.
[7]AP-TMAEE is N,N,N'-trimethyl-N'-3-aminopropyl-bis(aminoethyl) ether.
[8]DEOA is diethanolamine.

Toluene diisocyanate was added in an amount sufficient to produce foam with an NCO index of approximately 100. The formulation was mixed well for about 6 seconds at about 6,000 RPM using the same stirrer. The mixture was poured into a pre-heated mold at 70° C. and 4 minutes demold time. The pad-foams were removed from the mold, hand crushed, weighed and machine crushed at 75% pad thickness. Foams were stored under constant temperature and humidity according to DIN 50 014-23/50-1 standard specifications for 48 hours before being cut and tested. The physical properties of polyurethane foams were measured under ambient conditions and after humid ageing. The instant invention typically permits achieving the Desired Result. The table below shows some of the results obtained:

TABLE 5

| Catalyst | Desired | Conditions | Method (Units) | 33LV/BL11 PPHP | BDAMAPAU/ AP-TMAEE PPHP |
|---|---|---|---|---|---|
| PPHP | — | — | — | 0.4/0.12 | 0.3/0.3 |
| Tensile (Kpa) | ≥70 | Ambient | DIN 53571 (Kpa) | 170 | 171 |
| Elongation (%) | ≥70 | Ambient | DIN 53571 (%) | 75 | 71 |
| 50% Compression Set | ≤18 | Ambient | ASTM D3574-D (%) | 8 | 8 |
| Humid Aged Tensile (Kpa) | ≥70 | Volkswagen | DIN 53571 (%) | 160 | 43 |
| Humid Aged Elongation (%) | ≥70 | Volkswagen | DIN 53571 (%) | 106 | 35 |
| 50% Humid Aged Compression Set (%) | ≤30 | Volkswagen | ASTM D3574-D (%) | 35 | 43 |
| Humid Aged Load Loss | −45 to +15 | Volkswagen | ISO-3386-1 | −38 | −66 |

BDMAPAU = N,N'-bis(3-diethylaminopropyl)urea
AP-TMAEE = N,N,N'-trimethyl-N'-3-aminopropyl-bis(aminoethyl) ether Physical properties measured at ambient conditions were relatively similar for both catalyst packages. However, under humid aged conditions, the catalyst combination containing non-emissive catalysts AP-TMAEE and BDMAPAU showed extensive deterioration as evidenced by the values measured for HA-tensile, HA-elongation, HA-load loss and HA-compression set which all reflect a significant loss in mechanical integrity.

EXAMPLE 2

Physical properties comparison of foam made with isocyanate reactive tertiary amine catalysts and a gelling catalyst made when mixing isocyanate reactive tertiary amine with dimethyl tin di carboxylate salt Foam pads were made using the same procedure as in example 1 using the catalysts blend containing 0.30 pphp AP-TMAEE as blowing catalyst and a gelling catalyst made by mixing 0.15 pphp BDMAPAU and 0.05 pphp of DMTND (dimethyltindineodecanoate salt).

EXAMPLE 3

Physical properties of foam made with a gelling catalyst made when mixing isocyanate reactive tertiary amine with dimethyl tin di carboxylate salt in the presence of carboxylic acid Three foam pads were made using the same procedure as in example 1 using the catalysts blends containing: a) a mixture of tertiary amine catalyst obtained combining 0.30 pphp gelling catalyst BDMAPAU and 0.30 pphp blowing catalyst AP-TMAEE; b) gelling catalyst obtained combining 0.15 pphp catalyst BDMAPAU and 0.05 DMTND (dimethyltin dineodecanoate), 0.30 pphp blowing catalyst AP-TMAEE; c) delay action gelling catalyst obtained by mixing 0.15 pphp catalyst BDMAPAU and 0.05 DMTND, 0.30 pphp blowing catalyst AP-TMAEE and 1.0 pphp of phthalic acid-mono-[2-hydroxypropyl-poly(ethylene-oxide)] ester (PA-PEG200) made by condensation of one mole

TABLE 6

| Catalyst | Desired | Conditions | Method (Units) | BDMAPAU/ AP-TMAEE PPHP | DMTND/ BDMAPAU/ AP-TMAEE PPHP |
|---|---|---|---|---|---|
| PPHP | — | — | — | 0.3/0.3 | 0.05/0.15/0.3 |
| Tensile (Kpa) | ≥70 | Ambient | DIN 53571 (Kpa) | 171 | 179 |
| Elongation (%) | ≥70 | Ambient | DIN 53571 (%) | 71 | 80 |
| 50% Compression Set | ≤18 | Ambient | ASTM D3574-D (%) | 8 | 9 |
| Humid Aged Tensile (Kpa) | ≥70 | Volkswagen | DIN 53571 (%) | 43 | 56 |
| Humid Aged Elongation (%) | ≥70 | Volkswagen | DIN 53571 (%) | 35 | 40 |
| 50% Humid Aged Compression Set (%) | ≤30 | Volkswagen | ASTM D3574-D (%) | 43 | 35 |
| Humid Aged Load Loss | −45 to +15 | Volkswagen | ISO-3386-1 | −66 | −60 |

The result showed improvement in foam properties when using the gelling catalyst obtained by mixing a dimethyl tin carboxylate salt with gelling tertiary amine catalyst BDMAPAU. In particular, significant improvement is tensile strength, elongation, humid aged tensile and humid aged compression set are observed as shown in table above.

of phthalic anhydride and one mole of polyethylene glycol PEG-200. Condensation of PEG-200 with phthalic anhydride can be carried out by heating 1.2 mole of PEG-200 to about 100° C. and adding 1.0 mole of phtalic anhydride until the solid is dissolved and cooling the solution to room temperature to give PA-PEG-200.

TABLE 7

| Catalyst | Desired | Conditions | Method (Units) | DMTDL/ BDMAPAU/ AP-TMAEE PPHP | DMTND/ BDMAPAU/ AP-TMAEE/PA-PEG200 PPHP |
|---|---|---|---|---|---|
| PPHP | — | — | — | 0.05/0.15/0.3 | 0.05/0.15/0.3/1.0 |
| Tensile (Kpa) | ≥70 | Ambient | DIN 53571 (Kpa) | 179 | 182 |
| Elongation (%) | ≥70 | Ambient | DIN 53571 (%) | 80 | 74 |
| 50% Compression Set | ≤18 | Ambient | ASTM D3574-D (%) | 9 | 9 |
| Humid Aged Tensile (Kpa) | ≥70 | Volkswagen | DIN 53571 (%) | 56 | 91 |
| Humid Aged Elongation (%) | ≥70 | Volkswagen | DIN 53571 (%) | 40 | 59 |
| 50% Humid Aged Compression Set (%) | ≤30 | Volkswagen | ASTM D3574-D (%) | 35 | 32 |
| Humid Aged Load Loss | −45 to +15 | Volkswagen | ISO-3386-1 | −60 | −51 |

The result showed further improvement in foam properties when the carboxylic acid PA-PEG200 is used in combination with gelling catalyst mixture obtained by mixing DMTND and BDMAPAU.

EXAMPLE 4

Physical properties comparison of foam made with tertiary amine catalysts and gelling catalyst made when mixing tertiary amine with dimethyl tin di carboxylate salt in the presence of organic carboxylic di-acids Three foam pads were made using the same procedure as in example 1 using the catalysts blends containing: a) 0.30 pphp gelling catalyst BDMAPAU, 0.30 pphp blowing catalyst AP-TMAEE; b) gelling catalyst obtained by mixing 0.15 pphp catalyst BDMAPAU and 0.05 DMTND, 0.30 pphp blowing catalyst AP-TMAEE; c) delay gelling catalyst obtained by mixing 0.15 pphp catalyst BDMAPAU and 0.05 DMTND, 0.30 pphp blowing catalyst AP-TMAEE and 0.05 pphp of adipic acid.

combination with gelling catalyst mixture containing both tin and tertiary amine catalysts.

EXAMPLE 5

Curing profile comparison of elastomeric polyurethane polymers made with tertiary amine carboxylic acid complexes in conjunction with a dimethyl tin compound This example illustrates that tertiary amines in combination with a dimethyl tin compound provide for improved curing profiles and pot life times. The formulation which was used for the evaluation is given in Table 9. All components except of the isocyanate were blended together with a high speed stirrer at 3600 rpm. This blend was then stored at 40° C. for 24 hours. The MDI was also stored for 24 h before usage at 40° C. The amine/carboxylic acid compositions used in combination with dimethyltin compound are shown in Table 9. The curing profile of the different catalyst compositions were monitored via curing monitor device (Format Messtechnik). Reference is made to FIG. 1, which

TABLE 8

| Catalyst | Desired | Conditions | Method (Units) | DMTDL/ BDMAPAU/ AP-TMAEE PPHP | DMTND/ BDMAPAU/ AP-TMAEE/ Adipic Acid PPHP |
|---|---|---|---|---|---|
| PPHP | — | — | — | 0.05/0.15/0.3 | 0.05/0.15/0.3/0.05 |
| Tensile (Kpa) | ≥70 | Ambient | DIN 53571 (Kpa) | 179 | 195 |
| Elongation (%) | ≥70 | Ambient | DIN 53571 (%) | 80 | 108 |
| 50% Compression Set | ≤18 | Ambient | ASTM D3574-D (%) | 9 | 12 |
| Humid Aged Tensile (Kpa) | ≥70 | Volkswagen | DIN 53571 (%) | 56 | 101 |
| Humid Aged Elongation (%) | ≥70 | Volkswagen | DIN 53571 (%) | 40 | 76 |
| 50% Humid Aged Compression Set (%) | ≤30 | Volkswagen | ASTM D3574-D (%) | 35 | 29 |
| Humid Aged Load Loss | −45 to +15 | Volkswagen | ISO-3386-1 | −60 | −43 |

The result showed further improvement in foam properties when organic carboxylic di-acid adipic acid is used in combination is a plot of time v. dielectrical polarization of the reacting mixture catalyzed by catalysts 1, 2 and 3 shown in Table 10.

FIG. 1 shows that combination of BDMAPAU (N,N'-bis(3-diethylaminopropyl)urea) with dimethyltin dineodecanoate (commercially available from Dow as Metatin® 230) provides a relatively fast cure. Shore hardness was determined with a shore A durometer. The inventive catalyst can produce a cured polyurethane having a shore A durometer hardness of about 50 to about 80. Curing and pot life time were determined with curing monitor device (Format Messtechnik.

TABLE 9

Elastomeric Formulation
Elastomeric Formulation

| Component | Pphp |
| --- | --- |
| Polyether polyol (triol; OH # = 28) | 88.9 |
| 1,4-butane diol | 9.0 |
| Silicone Surfactant (Dabco DC5000) | 0.1 |
| Molecular sieve powder (3 A) | 2.0 |
| Catalyst | 0.4 |
| MDI (NCO # = 27.4) | 38 |

TABLE 10

Catalyst Compositions

| | PA-PEG200 wt % | BDMAPAU wt % | DMTND wt % |
| --- | --- | --- | --- |
| Catalyst 1 | 43.7 | 53.4 | 2.9 |
| Catalyst 2 | — | 97.1 | 2.9 |
| Catalyst 3 | 97.1 | — | 2.9 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for making polyurethane polymer comprising contacting at least one polyol and at least one isocyanate while in the presence of a catalyst composition comprising a combination of: i) at least one dimethyltin di-carboxylate salt, ii) at least one gelling tertiary amine catalyst, and iii) at least one organic carboxylic acid; wherein the at least one dimethyltin di-carboxylate salt is selected from the group consisting of dimethyltin dipropionate, dimethyltin dibutanoate, dimethyltin dipentanoate, dimethyltin dihexanoate, dimethyltin diheptanoate, dimethyltin dioctanoate, dimethyltin dinonanoate, dimethyltin didecanoate, dimethyltin diundecanoate, dimethyltin dimyristate, dimethyltin dipalmitate, dimethyltin distearate, dimethyltin dioleate, the corresponding neo-acid derivatives including dimethyltin dineopentanoate, dimehtyltin dineohexanoate, dimethyltin dineoheptanoate, dimethyltin dineooctanoate, dimethyltin dineononanoate, dimethyltin dineoundecanoate, dimethyltin dineododecanoate, dimethyltin dineotetradecanoate, dimethyltin dineohexadecanoate, and dimethyltin dineooctadecanoate.

2. The method of claim 1 wherein the method further comprising contacting in the presence of at least one blowing catalyst and at least one blowing agent thereby forming a polyurethane foam.

3. A method for making polyurethane polymer comprising contacting at least one polyol and at least one isocyanate while in the presence of a catalyst comprising a combination of: i) at least one dimethyltin di-carboxylate salt, ii) at least one dimethyltin mercaptide salt, iii) at least one gelling tertiary amine catalyst, and iv) at least one organic carboxylic acid; wherein the at least one dimethyltin di-carboxylate salt is selected from the group consisting of dimethyltin dipropionate, dimethyltin dibutanoate, dimethyltin dipentanoate, dimethyltin dihexanoate, dimethyltin diheptanoate, dimethyltin dioctanoate, dimethyltin dinonanoate, dimethyltin didecanoate, dimethyltin diundecanoate, dimethyltin dimyristate, dimethyltin dipalmitate, dimethyltin distearate, dimethyltin dioleate, the corresponding neo-acid derivatives including dimethyltin dineopentanoate, dimehtyltin dineohexanoate, dimethyltin dineoheptanoate, dimethyltin dineooctanoate, dimethyltin dineononanoate, dimethyltin dineoundecanoate, dimethyltin dineododecanoate, dimethyltin dineotetradecanoate, dimethyltin dineohexadecanoate, and dimethyltin dineooctadecanoate.

4. The method of claim 3 further comprising contacting in the presence of at least one blowing catalyst and at least one blowing agent thereby forming a polyurethane foam.

* * * * *